US005135798A

United States Patent [19]

Muschter et al.

[11] Patent Number: 5,135,798

[45] Date of Patent: * Aug. 4, 1992

[54] MULTILAYER, FLEXIBLE TRANSFER STRIP

[75] Inventors: Sigo Muschter; Ernst Kunkel, both of Hanover; Petra Bubolz, Garbsen; Wolfhard Rutz, Hanover, all of Fed. Rep. of Germany

[73] Assignee: Pelikan Aktiengesellschaft, Hanover, Fed. Rep. of Germany

[ * ] Notice: The portion of the term of this patent subsequent to Jan. 2, 2007 has been disclaimed.

[21] Appl. No.: 685,961

[22] Filed: Apr. 12, 1991

Related U.S. Application Data

[63] Continuation of Ser. No. 274,070, Nov. 18, 1988, abandoned.

[30] Foreign Application Priority Data

Dec. 3, 1987 [DE] Fed. Rep. of Germany ....... 3741022
Oct. 20, 1988 [DE] Fed. Rep. of Germany ....... 3835783

[51] Int. Cl.[5] .............................................. B32B 27/20

[52] U.S. Cl. .................................... 428/202; 428/352; 428/353; 428/354; 428/425.1; 428/479.3; 428/914; 156/230; 156/246; 156/247; 156/249

[58] Field of Search ............... 156/230, 249, 246, 247; 428/202, 203, 353, 392, 414, 425.1, 479.3, 220, 352, 354, 914

[56] References Cited

U.S. PATENT DOCUMENTS

| | | | |
|---|---|---|---|
| 2,746,877 | 5/1956 | Matthes | 156/230 |
| 3,131,106 | 4/1964 | Mackenzie | 156/230 |
| 3,298,850 | 1/1967 | Reed et al. | 156/230 |
| 4,078,113 | 3/1978 | Starbuck et al. | 156/246 |
| 4,233,358 | 11/1980 | Jones et al. | 156/246 |
| 4,576,854 | 3/1986 | Kurahashi | 428/204 |
| 4,786,537 | 11/1988 | Sasaki | 428/352 |
| 4,891,260 | 1/1990 | Kunkel | 428/220 |

FOREIGN PATENT DOCUMENTS 2626891 12/1977 Fed. Rep. of Germany .

*Primary Examiner*—Caleb Weston
*Attorney, Agent, or Firm*—Herbert Dubno

[57] ABSTRACT

A multilayer, flexible transfer strip with an auxiliary carrier and a contact adhesive coating, whereby between the auxiliary carrier and the contact adhesive coating is provided a binder-containing transfer coating, which has a stronger adhesion to the contact adhesive coating than to the auxiliary carrier. The binder-containing transfer coating contains a tear-off aid in the form of a soluble cellulose derivative. On incorporating white pigments into the transfer coating, the transfer strip can be used for correcting written representations or typed characters. Correction takes place rapidly and simply and leads to the formation of a uniform coating with a sharp tear-off.

13 Claims, 1 Drawing Sheet

MULTILAYER, FLEXIBLE TRANSFER STRIP

This is a continuation of co-pending application Ser. No. 07/274,070 filed on Nov. 18, 1988, abandoned.

CROSS REFERENCE TO RELATED APPLICATIONS

This application is related to the commonly owned copending applications Ser. No. 07/221,858 filed Jul. 22, 1988 U.S. Pat. No. 4,891,260 and Ser. No. 07/120,302 filed Nov. 13, 1987, now U.S. Pat. No. 4,851,076.

FIELD OF THE INVENTION

Our present invention relates to a multilayer, flexible transfer strip or ribbon with a carrier and a contact adhesive layer and between the auxiliary carrier and the contact adhesive layer is provided a binder-containing transfer layer, which has a greater adhesion with respect to the contact adhesive layer than with respect to the auxiliary carrier.

BACKGROUND OF THE INVENTION

Numerous possibilities are known according to which pigmented, liquid systems can be used for covering incorrect written representations. Thus, in the office field, white pigmented dispersions containing a highly volatile organic solvent are applied with a brush for correcting typed characters and the like. However, the evaporation of the highly volatile organic solvent is detrimental to the environment. It is necessary to wait a relatively long time before evaporation is ended and typing over is possible. The application of correction dispersions with a brush generally does not lead to a uniform coating.

Better correction is made possible by the system of German Open Application DE-OS 26 26 891, which describes a multilayer, flexible transfer sheet, which is formed from a carrier coated with an adhesive separating layer, a polyvinyl alcohol-bound transfer layer and a thin adhesive coating. The transfer layer also contains titanium white as the pigment. After removal of the auxiliary carrier, the transfer layer serves as a correction coating for incorrectly typed characters. There is no mention of use in a hand transfer roller, as described hereinafter in connection with the invention and, as tests have shown, the system of this patent does not yield the desired sharp tear-off of the correct coating from the carrier.

OBJECTS OF THE INVENTION

The principal object of the present invention is to so further develop the aforementioned transfer strip, that the binder-containing transfer coating can be cleanly and sharply applied to the points or regions to be covered and also can be used in a hand held device to permit a simple, rapid and uniform application to the substrate.

A more general object is to provide an improved cover strip ribbon which avoids drawbacks of earlier systems.

SUMMARY OF THE INVENTION

These objects are achieved in that the binder-containing transfer coating contains a tear-off aid in the form of a soluble cellulose derivative.

The carrier of the inventive flexible transfer strip, hereinafter frequently referred to as an "auxiliary" carrier because it is separated from the transferred layer in use, preferably comprises a plastic film, as are used in connection with the carriers of typewriter ribbons, e.g. of polyethylene terephthalate, polypropylene, polyethylene, polyvinylchloride and polycarbonate. Silicone-coated papers are also suitable as the auxiliary carrier. The silicone coating reduces the adhesive force between the binder-containing transfer coating and the auxiliary carrier. The silicone coating can also be replaced by a different antiblocking agent, e.g. by polytetrafluoroethylene.

The auxiliary carrier thickness is preferably approximately 10 to 60 μm, particularly 15 to 55 μm, the transfer coating has a thickness of approximately 5 to 40 μm, preferably approximately 15 to 25 μm, and the contact adhesive coating a thickness of approximately 1 to 8 μm, preferably approximately 2 to 5 μm. In order to optimize the inventive transfer strip, it is appropriate to choose a thickness ratio of the contact adhesive coating to the transfer coating of approximately 1:4 to 1:12, preferably approximately 1:8 to 1:10.

The contact adhesive coating can comprise commercially available contact adhesives. These are materials which constitute elastic and permanently adhesive self-adhesive masses with high adhesive forces and which immediately adhere to various surfaces under limited pressure at ambient temperature. They are preferably applied in an aqueous solution to the transfer coating already located on the auxiliary carrier, because in this way the already formed binder-containing transfer coating is not dissolved again. Among the contact adhesives of this type, those based on acrylates are particularly advantageous.

The starting materials can be viscous solutions or dispersions, which are based on rubber, polyacrylates, polyvinylethers or polyvinylisobutylene. Preference is given to materials based on polyacrylates. Suitable commercial products are Ucecryl 913R and Ucecryl PC80 (marketed by the firm UCB, Ammelicht, Belgium), as well as plastic dispersion VP 859/6 (marketed by Freihoff). Preferably the contact adhesive material to be applied and which is regularly present in an aqueous medium, contains wetting agents or surfactants (marketed under the tradename Byk W).

The solutions or dispersions of the contact adhesive for forming the contact adhesive coating are preferably applied in a quantity of approximately 1 to 5 $g/m^2$ and in particularly preferred manner approximately 2 to 4 $g/m^2$ to the transfer coating.

For the formation of the binder-containing transfer coating, preference is given to the use of thermoplastic or thermoplastic polymers in solution or in the form of a dispersion. These substances can include, according to the invention:

a) Polyurethanes with a molecular weight of 15,000 to 50,000, e.g. Permuthane U 4924 of Stahl-Chemie or Desmolac 2100 of Bayer AG;

b) linear, saturated polyesters with a molecular weight of 20,000 to 30,000, e.g. Vitel PE 307 of Goodyear Tire & Rubber;

c) styrene-isoprene-styrene copolymers, e.g. Cariflex TR 1107 of Shell-Chemie;

d) acrylates and methacrylates, e.g. Pexigum 7 H of Roehm GmbH;

e) diphenyl carboxylic acid-modified polyamides, e.g. Scope 30 of Rhone-Poulenc or Emerez 1533 of Emery Chemicals;

f) polymer dispersions based on vinylpropionate, e.g. Propiofan 6D of BASF; and g) carboxymethyl group-containing, water-soluble polymethacrylate, e.g. Rohagit SD 15 of Roehm GmbH.

This list does not claim to be complete and does not represent a restriction as regards choice. It will be readily apparent to the worker in the art that other binders can be used, particularly as the nature of the binder does not constitute the essence of the invention.

In order to achieve an optimum embodiment of the invention, when choosing the particular binder for forming the transfer coating, account must also be taken of the nature of the plasticizer used. A plasticizer should be used which, on applying the transfer coating to the surface to be corrected or covered, does not penetrate the normally thin contact adhesive coating and does not come into contact with the point on the substrate to be corrected or the coloring agents located there and does not dissolve same in a disturbing manner, accompanied by the discoloration of the transfer coating. It has been found that standard plasticizers, such as silicone, castor and mineral oils are suitable. Other plasticizers used in preferred manner in other fields, such as e.g. phthalates and olein alcohol are not as suitable. In order to counteract the disadvantageous effect of plasticizers in borderline cases, into the binder-containing transfer coating can be incorporated a so-called "lake", which precipitates or renders insoluble any migrating coloring agent, so that the same does not migrate into the transfer coating applied, so as to recolor it. Suitable lakes are tannin and tannin derivatives. In general, it is possible to us lakes of the type known from the field of inks and India inks. They are preferably present in a quantity of approximately 0.5 to 5% by weight, particularly 1.5 to 3.5% by weight in the binder-containing transfer coating. Particular preference is given to an amount of approximately 2 to 2.5% by weight.

During the preparation of the transfer strip according to the invention, the binder selected for forming the transfer coating is preferably brought into the form of a solution or, when a polymer dispersion is present, is used as a dispersion.

The choice of solvent is dependent on the nature of the binder used. Preference is given to low to medium-boiling, organic solvents from the group of alcohols, such as ethanol, isopropanol and butanol, ketones, such as acetone and methyl ethyl ketone, esters, such as methyl and ethyl acetate, aromatic hydrocarbons, such as toluene or benzene, aliphatic hydrocarbons, in the boiling range 70° to 140° C., alone or mixed, as well as water, alone or mixed with low-boiling, water-soluble organic solvents.

The specific binder concentration in the solution or dispersion is not critical as a limitation to the invention. As a rough guideline, it can be between approximately 3 and 15% by weight, preference being given to the range approximately 4 to 10% by weight. For the formation of the transfer coating, the solution or dispersion is preferably applied in a quantity of 15 to 25 $g/m^2$ and in particularly preferred manner between 18 and 22 $g/m^2$ to the auxiliary carrier.

Within the framework of the invention the term "coloring agent" is to be understood in the widest sense and constitutes a collective term for all color-imparting substances, including dyes and pigments whereby the latter can also have a filler character. Dyes are understood to mean those coloring agents, which are soluble in water, organic solvents or binders, as opposed to pigments which are insoluble.

The coloring effect can be immediately present, but can also appear through fluorescence. The latter e.g. applies in the case of fluorescent luminous colors. If the invention transfer strip is used for correcting typed characters, pictorial representations, etc., the binder-containing transfer coating should generally contain white pigments, such as titanium white, precipitated chalk, alumina or colloidal silicic acids.

If the transfer coating is to be colored, then the coloring agents used are inorganic pigments, such as chrome yellow, ochre, iron oxide red, cobalt blue, ultramarine blue, berlin blue, or organic pigments, such as alkali blue, phthalocyanins, azo dyes, anthraquinonoids, metal complex pigments, as well as carbon blacks and iron oxide black. Examples of fluorescent dyes are Blaze Orange T 15 of Dayglo, Maxilonbrillant flavin 10 GFF of Ciba Geigy, Pyranin of Bayer AG and Basonyl-Rot 540 of BASF.

The control of the optimum covering function of the inventive transfer strip, particularly that of the binder-containing transfer coating, can take place through the pigment content. The optimum pigment content is dependent on various factors, such as the nature of the binder chosen, the actual pigment and the incorporated additives. A particularly critical value or range cannot be given. As a rough guideline, the binder/pigment ratio gives a weight ratio of approximately 1:1 to 1:12, particularly 1:3 to 1:8 and more particularly approximately 1:4 to 1:7.

The essential component of the binder-containing transfer coating of the inventive transfer strip is a "tear-off aid". Only with the use of such a tear-off aid can we ensure that on applying the transfer coating to a substrate there will be a clean tear-off under tensile stress conditions (i.e. sharp separation of the transfer coating applied to the substrate from that remaining on the carrier when the carrier is pulled away from the substrate, e.g. with the hand-held applicator device).

It has surprisingly been found that a relatively limited compound group has the desired characteristics as tear-off aids within the scope of the invention, namely soluble cellulose derivatives. Particularly preferred cellulose derivatives are cellulose ethers which are soluble in organic solvents and/or water, such as methyl, ethyl, hydroxyethyl, ethylhydroxyethyl and carboxymethyl celluloses, cellulose esters, such as cellulose acetate, acetobutyrate and propionate. However, numerous other soluble cellulose derivatives are suitable and bring about the desired effects. It would appear that the basic cellulose structure in the soluble cellulose derivative is important, while the introduced groups, such as the ethyl group, etc. lead to the derivative formed being soluble in the particular chosen solvent.

The exact quantity of the tear-off aid incorporated into the transfer coating is not critical, being dependent on the nature of the binder, that of the pigment and that of the other incorporated additives. Preference is given to a quantity of approximately 0.5 to 5% by weight, particularly approximately 1.5 to 3.5% by weight. These details refer to the dry substance. The quantity ratio of the tear-off aid to the binder could also be used as a basis for the formation of the transfer coating. As a rough guideline the transfer aid to binder ratio could be given as approximately 1:2 to 1:20, preference being given to the range of approximately 1:4 to 1:10.

For controlling the application process and also the characteristics of the transfer coating applied to the substrate, further additives can be incorporated into the same. These can in particular be agents for improving the covering power, such as in particular aluminosilicate, tinting agents, such as e.g. carbon black, or the aforementioned lakes, particularly for basic dyes in the form of e.g. gallic acid derivatives, such as Printan cf Ciba Geigy.

The aforementioned materials of the individual coatings of the inventive transfer strip generally satisfy the basic requirement that the adhesive tension (defined via the adhesional work corresponding to the Dupre equation, of. K. L. Wolf "Physik und Chemie der Grenzflächen", Springer verlag 1957, p. 164) between the contact adhesive coating and the transfer coating is higher than that between the auxiliary carrier and the transfer coating. If this is not so in a particular case, then a suitable antiblocking agent must be applied to the auxiliary carrier in order to fulfill this basic requirement. In such cases a further requirement is that the transfer coating formed on the substrate is non-adhesive with respect to other materials, particularly paper, coming into contact therewith. Thus, the following adhesive tension conditions can lead to the successful use of the inventive transfer strip, whereby the symbol "S" represents the adhesive tension ratio between the different materials, i.e. $S_1$ paper/contact adhesive coating, $S_2$ transfer coating/contact adhesive coating, $S_3$ transfer coating/auxiliary carrier, $S_4$ transfer coating/paper and $S_5$ contact adhesive coating/auxiliary carrier and the following requirements are respected: $S_1$ higher than $S_3$, $S_2$ higher than $S_3$, $S_5$ much smaller than $S_2$ and $S_5$ smaller than $S_3$. Moreover, the free surface of the transfer coating applied to a substrate, particularly paper should not have an adhesive power to the outside, i.e. $S_4$ is then zero or moves toward zero. In other words, the applied transfer coating on contact with the hand or paper should not be adhesive.

The advantageous process for producing the transfer strip according to the invention is characterized in that a suitable plastics solution, which contains the aforementioned tear-off aid, is applied by conventional application technology, e.g. a doctor blade, to an auxiliary carrier in the form of a flexible film, the solvent is evaporated at elevated temperature, then an aqueous dispersion containing a contact adhesive is applied by conventional application technology, such as with a doctor blade or a roll coater, to the binder-containing transfer coating formed and subsequently the water is evaporated.

When using the transfer strip according to the invention, it is advantageous to use commercial applicators, which permit a roll transfer of the transfer coating provided with the contact adhesive, while simultaneously drawing in the auxiliary carrier. This leads to particularly easy handling of the inventive transfer strip. They can be constituted by commercially available hand devices. A particularly suitable device of this type is a so-called hand roller, where a delivery spool with the transfer strip is located within an easy-to-grip housing and from there it is led out of an applicator foot projecting from the housing and from said foot is returned to a winding spool in the housing. A suitable gear between the spools in the housing ensures that the transfer strip is always adequately tensioned. For using the transfer strip, the user takes the housing in his hand and by means of the applicator foot presses the outer (detachable) strip coating passing over the terminal edge against the substrate to which it is to be transferred (e.g. a printed sheet of paper for carrying out corrections).. During pressing, the user moves the device relative to the substrate and thereby transfers an e.g. covering or fluorescent coating to the substrate, the flexible auxiliary carrier being unwound from the delivery spool and wound onto the winding spool.

The inventive transfer strip is particularly suitable for use as a correction medium in the office, school and home for the purpose of covering incorrectly typed characters, markings, drawings and reinscriptions. Another use of the transfer strip can be for the colored marking of surfaces, documents and/or signs and then the transfer strip contains a transfer coating containing a colored pigment. Another use is the stressing of text points, symbols or pictorial representations. For this purpose the transfer coating is preferably transparent and colored with a daylight-fluorescent coloring agent. In all the presently mentioned us examples it is particularly advantageous that application takes place "dry", i.e. there is no smudging of liquid coatings: and no evaporation of objectionable solvents, so that immediate reinscription is possible. Thus, the inventive transfer strip permits the easy, rapid and uniform application to substrates of e.g. covering coatings, which in particular contain coloring agents. If the transfer coating of the inventive transfer strip is transparent, i.e. does not contain any covering pigments for example, then it can be used for the mere covering without coloring action and also for preserving and protecting written characters which would otherwise be sensitive to the action of air and the like.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION AND EXAMPLES

Figure 1:
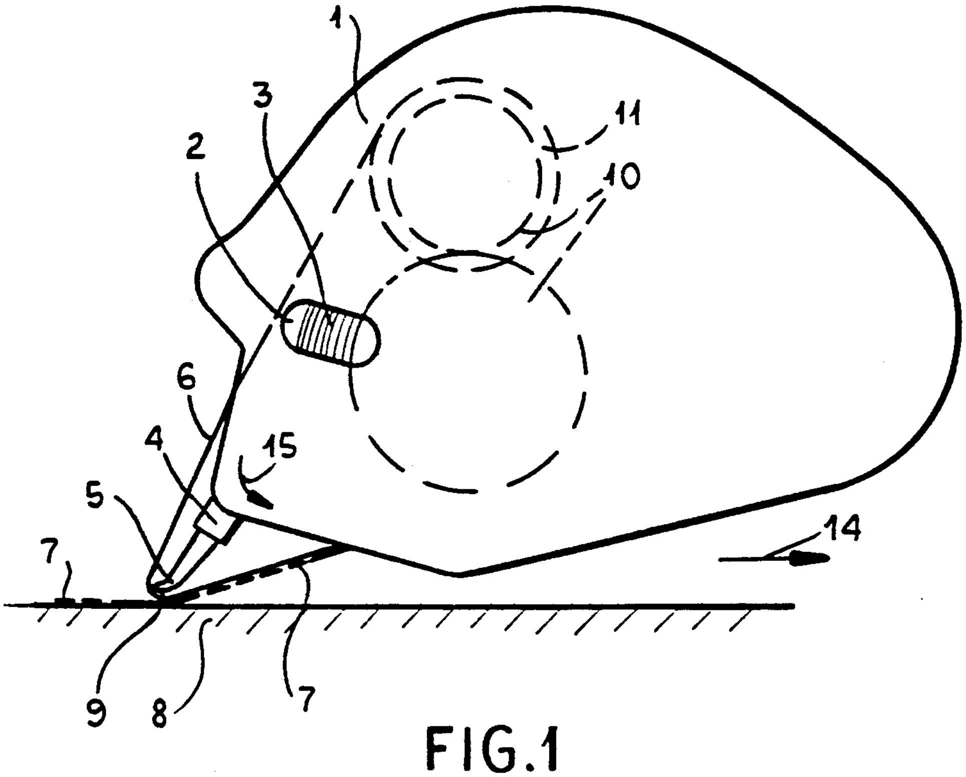
FIG. 1 is a side elevational view showing a hand-held device used in the application of the strip of the invention to a substrate.
Figure 2:
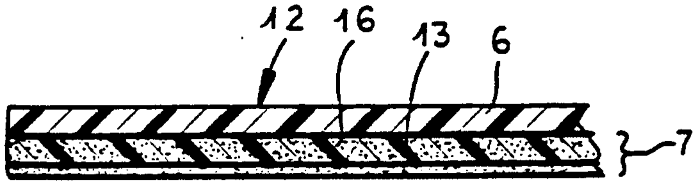
FIG. 2 is a cross sectional view through a portion of the strip.

From FIG. 1 it will be apparent that a hand-held device 1 can have a window 2 through which a supply spool 3 of the ribbon or strip of the invention is visible. A gear connection represented at 10 couples the supply spool with a takeup spool 11 to allow the transfer strip of the invention, consisting of a carrier ribbon 6 and a transfer portion 7 to be applied to a substrate 8 which is a sheet of paper. Via guides not shown, the transfer strip, designated as a whole at 12, passes from the supply spool with the adhesive layer 13 turned downwardly, out of the housing 1 and around the pressing stage 9 of a resilient foot 5 affixed to a rigid support 4 projecting from the housing. The layer 7, which bonds to the substrate 8 with a greater force than the bond to the carrier foil 6, remains adherent to the substrate 8 as the housing is drawn in the direction of arrow 14 while forces applied in the direction of arrow 15, pressing the strip 12 against the substrate. The portion 7 separates from the foil 6 where the latter bends around the edge 9 so that the foil 6, free from the transfer layers, can be wound up on the takeup spool. The layer 7 comprises the colored layer 16 together with the adhesive layer 13, the colored layer containing the cellulosic tear-off aid so that, when the housing 1 is moved away from the substrate, the layer 7 will rupture with a clean break and leaving a clean strip of the color layer 7 upon the substrate.

SPECIFIC EXAMPLES

EXAMPLE 1

Firstly, the following dispersion is prepared for forming the coloring agent-containing transfer coating (p.b.w.=parts by weight):

| | |
|---|---|
| Solvent-soluble polyurethane (Permuthane U 4924) (25% is isopropyl alcohol/toluene, mixing ratio 1:1) | 19.0 p.b.w. |
| Isopropanol | 10.0 p.b.w. |
| Toluene | 35.0 p.b.w. |
| Lake (Printan G) | 1.0 p.b.w. |
| Ethylcellulose N7 (tear-off aid) | 1.0 p.b.w. |
| Titanium dioxide (Kronos RN34) | 29.0 p.b.w. |
| Aluminosilicate P820 (covering power improving agent) | 5.0 p.b.w. |
| Carbon black (Printex 140 V) (tinting agent) | 0.01 p.b.w. |
| | 100.01 p.b.w. |

The above covering substance was applied with a doctor blade in a quantity of 18 g/m$^2$ to a siliconized paper carrier. The solvent was then evaporated at approximately 100° C. by passing over hot air. Using a doctor blade, an aqueous dispersion having the following constituents was then applied to the surface of the coloring agent-containing covering coating:

| | |
|---|---|
| Acrylate-based contact adhesive (plastics dispersion VP 859/6 of Freihoff) (acrylic ester-based copolymer) | 66.9 p.b.w. |
| Water | 33.0 p.b.w. |
| Wetting agent or surfactant (Byk W) | 0.1 p.b.w. |
| | 100.0 p.b.w. |

The contact adhesive substance was applied with a thickness of 2 g/m$^2$ using a doctor blade. The water fraction was then evaporated at approximately 100° C. by passing over hot air.

The transfer strip obtained was particularly suitable for covering typed characters on paper. It led to a rapid, uniform application of a cover strip on which it was possible to directly retype. Application took place by means of a commercially available hand roller.

EXAMPLE 2

Example 1 was modified in that for forming the coloring agent-containing transfer coating, the following formulation was used:

| | |
|---|---|
| Polyurethane (Desmolac 2100 of Bayer AG) | 5.0 p.b.w. |
| Methylethyl ketone | 30.0 p.b.w. |
| Toluene | 28.6 p.b.w. |
| Maxilonbrillantflavin 10 GFF (BASF) | 1.0 p.b.w. |
| Basonyl-Rot 540 (BASF) | 0.4 p.b.w. |
| Titanium dioxide (Kronos RN 34) | 29.0 p.b.w. |
| Aluminosilicate P 820 (Degussa) | 5.0 p.b.w. |
| Ethyl cellulose N7 (Hercules) | 1.0 p.b.w. |

The transfer coating of the transfer strip obtained had a good covering power, was colored (orange) and had no fluorescence.

EXAMPLE 3

Example 1 was modified in such a way that the following formulation was used for forming the coloring agent-containing transfer coating:

| | |
|---|---|
| Linear, saturated polyester (Vitel PE 700 - Goodyear) | 4.0 p.b.w. |
| Methylethyl ketone | 30.0 p.b.w. |
| Toluene | 31.0 p.b.w. |
| White pigment, zinc sulphide (Sachtolith L - Sachtleben GmbH) | 25.0 p.b.w. |
| Ethyl cellulose N7 (Hercules) | 1.0 p.b.w. |
| Blaze Orange T 15 (Dayglo) | 9.0 p.b.w. |

The transfer coating of the transfer strip obtained had a good covering power, was colored (orange) and had fluorescence.

EXAMPLE 4

Example 1 was modified in such a way that the following formulation was used for forming the coloring agent-containing transfer coating:

| | |
|---|---|
| Styrene-isoprene-styrene copolymer (Cariflex TR 1107 - Shell) | 4.7 p.b.w. |
| Methylethyl ketone | 42.0 p.b.w. |
| Toluene | 42.0 p.b.w. |
| Redglo Soluble Toner GF 13 (Redglo) | 0.8 p.b.w. |
| Ethyl cellulose N 22 (Hercules) | 1.0 p.b.w. |
| Aluminum stearate Alugel TH 34 (Bärlocher) | 8.0 p.b.w. |
| Silicic acid (Aerosil 200 - Degussa) | 1.0 p.b.w. |

The transfer coating of the transfer strip obtained was transparent and colored (orange).

EXAMPLE 5

Example 1 was modified in such a way that the following formulation was used for forming the coloring agent-containing transfer coating:

| | |
|---|---|
| Vinylpropionate-based polymer dispersion (Propionfan 6D - BASF) | 20.0 p.b.w. |
| Titanium dioxide (Kronos RNCX) | 30.0 p.b.w. |
| Aluminosilicate P 820 | 5.0 p.b.w. |
| Water | 28.5 p.b.w. |
| Walocel MW 50 GB (Wolff & Co.) | 1.0 p.b.w. |
| Isopropanol | 14.0 p.b.w. |
| Aqueous solution of a silicone-free, halogenated, organic compound (froth suppressor SF - Hoechst AG) | 1.0 p.b.w. |
| Sodium dioctyl sulphosuccinate (Lutensit ABO/wetting agent - BASF) | 0.5 p.b.w. |

The transfer coating of the transfer strip obtained has a good covering power and was white.

We claim:

1. A multilayer flexible transfer strip which comprises:

a flexible carrier;

a binder-containing transfer coating on said carrier containing 0.5 to 5% by weight of at least one soluble cellulose compound for a tear-off aid enabling separation of a portion of said coating transferred to a substrate and a portion of said coating retained on said carrier, said tear-off aid to said binder being present in a weight ratio of approximately 1:2 to 1:20; and a contact adhesive coating on said transfer coating, said transfer coating having a greater adhesion to said contact adhesive coating than to said carrier, and said contact adhesive coating capable of adhering to said substrate.

2. The transfer strip defined in claim 1 wherein said tear-off aid is selected from the group consisting of methyl, ethyl, hydroxyethyl, ethylhydroxyethyl and carboxymethyl celluloses.

3. The transfer strip defined in claim 1 wherein said tear-off aid includes ethylcellulose.

4. The transfer strip defined in claim 1 wherein said carrier is a plastic foil or a silicone-coated paper.

5. The transfer strip defined in claim 1 wherein said transfer coating contains polyurethane binder.

6. The transfer strip defined in claim 5 wherein the polyurethane is an aliphatic one-component polyurethane.

7. The transfer strip defined in claim 1 wherein said transfer coating includes at least one coloring agent.

8. The transfer strip defined in claim 7, wherein said coloring agent is a pigment.

9. The transfer strip defined in claim 8 for correction of print on said substrate wherein said pigment is a white pigment capable of covering said print.

10. The transfer strip defined in claim 8 for marking said substrate wherein said pigment is an organic or inorganic colored pigment.

11. The transfer strip defined in claim 7 wherein said coloring agent is a fluorescent dye.

12. The transfer strip defined in claim 1 wherein said transfer coating contains a lake for basic dyes.

13. The transfer strip defined in claim 1 wherein said contact adhesive coating and said transfer coating have a respective thickness in a relative ratio of approximately 1:4 to 1:12.

* * * * *